(12) United States Patent
Kumar et al.

(10) Patent No.: US 12,348,534 B2
(45) Date of Patent: Jul. 1, 2025

(54) METHOD AND SYSTEM FOR DETECTING INTRUSION IN A VEHICLE SYSTEM

(71) Applicant: Cummins Inc., Columbus, IN (US)

(72) Inventors: Sharika K. Kumar, Columbus, IN (US); Subhojeet Mukherjee, Columbus, IN (US); Howard Bishop, Columbus, IN (US); Christopher S. York, Greenwood, IN (US); Andrew T. Hillery, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 642 days.

(21) Appl. No.: 17/611,084

(22) PCT Filed: May 13, 2020

(86) PCT No.: PCT/US2020/032710
§ 371 (c)(1),
(2) Date: Nov. 12, 2021

(87) PCT Pub. No.: WO2020/232147
PCT Pub. Date: Nov. 19, 2020

(65) Prior Publication Data
US 2022/0232022 A1    Jul. 21, 2022

Related U.S. Application Data

(60) Provisional application No. 62/846,999, filed on May 13, 2019.

(51) Int. Cl.
*H04L 9/40* (2022.01)
*B60R 25/20* (2013.01)
*B60R 25/30* (2013.01)

(52) U.S. Cl.
CPC .......... *H04L 63/1416* (2013.01); *B60R 25/20* (2013.01); *B60R 25/30* (2013.01)

(58) Field of Classification Search
CPC ...... H04L 63/1416; B60R 25/20; B60R 25/30
See application file for complete search history.

(56) References Cited

U.S. PATENT DOCUMENTS

| 1,025,698 | A | * | 5/1912 | Hopkins | ................ G06C 23/02 377/2 |
| 6,337,625 | B1 | * | 1/2002 | Taylor | ..................... G01S 13/04 340/552 |

(Continued)

FOREIGN PATENT DOCUMENTS

| CN | 109495439 A | 3/2019 |
| EP | 2950482 A1 | 12/2015 |

(Continued)

OTHER PUBLICATIONS

International Preliminary Report on Patentability received for PCT Patent Application No. PCT/US2020/032710, mailed on Nov. 25, 2021, 8 pages.

(Continued)

*Primary Examiner* — Yonas A Bayou
(74) *Attorney, Agent, or Firm* — Faegre Drinker Biddle & Reath LLP

(57) ABSTRACT

Methods and systems of improving security of a computing system having a network of embedded devices are disclosed. The method includes starting a timer of a predetermined length of time, obtaining an expected number of cyclic messages to be received within the predetermined length of time, incrementing a message counter each time a cyclic message is received within the predetermined length of time, incrementing a set counter in response to an actual number of cyclic messages received by the end of the predetermined length of time exceeding the expected number of cyclic messages to be received by a first threshold value, and detecting an intrusion in the system in response to the set (Continued)

counter exceeding a second threshold value by the end of the predetermined length of time.

19 Claims, 8 Drawing Sheets

(56) References Cited

U.S. PATENT DOCUMENTS

| | | | |
|---|---|---|---|
| 9,288,048 B2 | 3/2016 | Han | |
| 9,409,548 B2* | 8/2016 | Kawamoto | G08B 29/185 |
| 9,578,047 B2* | 2/2017 | Laifenfeld | H04L 63/1425 |
| 9,854,442 B2 | 12/2017 | Mazzara | |
| 10,083,071 B2 | 9/2018 | Sonalker | |
| 2005/0009927 A1 | 5/2005 | Saski | |
| 2005/0099271 A1* | 5/2005 | Sasaki | B60R 25/1004 |
| | | | 340/426.1 |
| 2006/0015941 A1* | 1/2006 | McKenna | G06F 21/577 |
| | | | 726/23 |
| 2006/0159414 A1 | 7/2006 | Wolf et al. | |
| 2007/0015615 A1 | 7/2007 | Newman | |
| 2007/0152615 A1* | 7/2007 | Newman | E05F 15/46 |
| | | | 318/481 |
| 2008/0203815 A1 | 8/2008 | Ozawa | |
| 2008/0206815 A1* | 8/2008 | Brown | C12N 9/2437 |
| | | | 435/325 |
| 2013/0339703 A1* | 12/2013 | Alexander | G06F 9/52 |
| | | | 712/244 |
| 2015/0066239 A1 | 3/2015 | Mabuchi | |
| 2015/0358351 A1 | 12/2015 | Otsuka et al. | |
| 2016/0055730 A1 | 2/2016 | Bergman et al. | |
| 2016/0294855 A1 | 10/2016 | Maeda | |
| 2016/0381068 A1 | 12/2016 | Galula et al. | |
| 2017/0286675 A1 | 10/2017 | Shin | |
| 2017/0341605 A1 | 11/2017 | Ben Noon et al. | |
| 2018/0012019 A1 | 1/2018 | Harris et al. | |
| 2018/0131712 A1 | 5/2018 | Cornelio et al. | |
| 2018/0196941 A1 | 7/2018 | Ruvio et al. | |
| 2019/0081960 A1 | 3/2019 | Kupfer et al. | |

FOREIGN PATENT DOCUMENTS

| | | |
|---|---|---|
| WO | 03/45743 A1 | 6/2003 |
| WO | 2016055730 A1 | 4/2016 |
| WO | 2017013622 A1 | 1/2017 |
| WO | 2017127639 A1 | 10/2017 |
| WO | 2018029692 A1 | 2/2018 |

OTHER PUBLICATIONS

Invitation to Pay Additional Fees received for PCT Patent Application No. PCT/US2020/032710, mailed on Jun. 25, 2020, 2 pages.
International Search Report and Written Opinion for International patent application No. PCT/US2020/032710, filed May 13, 2020, mailed Sep. 29, 2020.

* cited by examiner

100

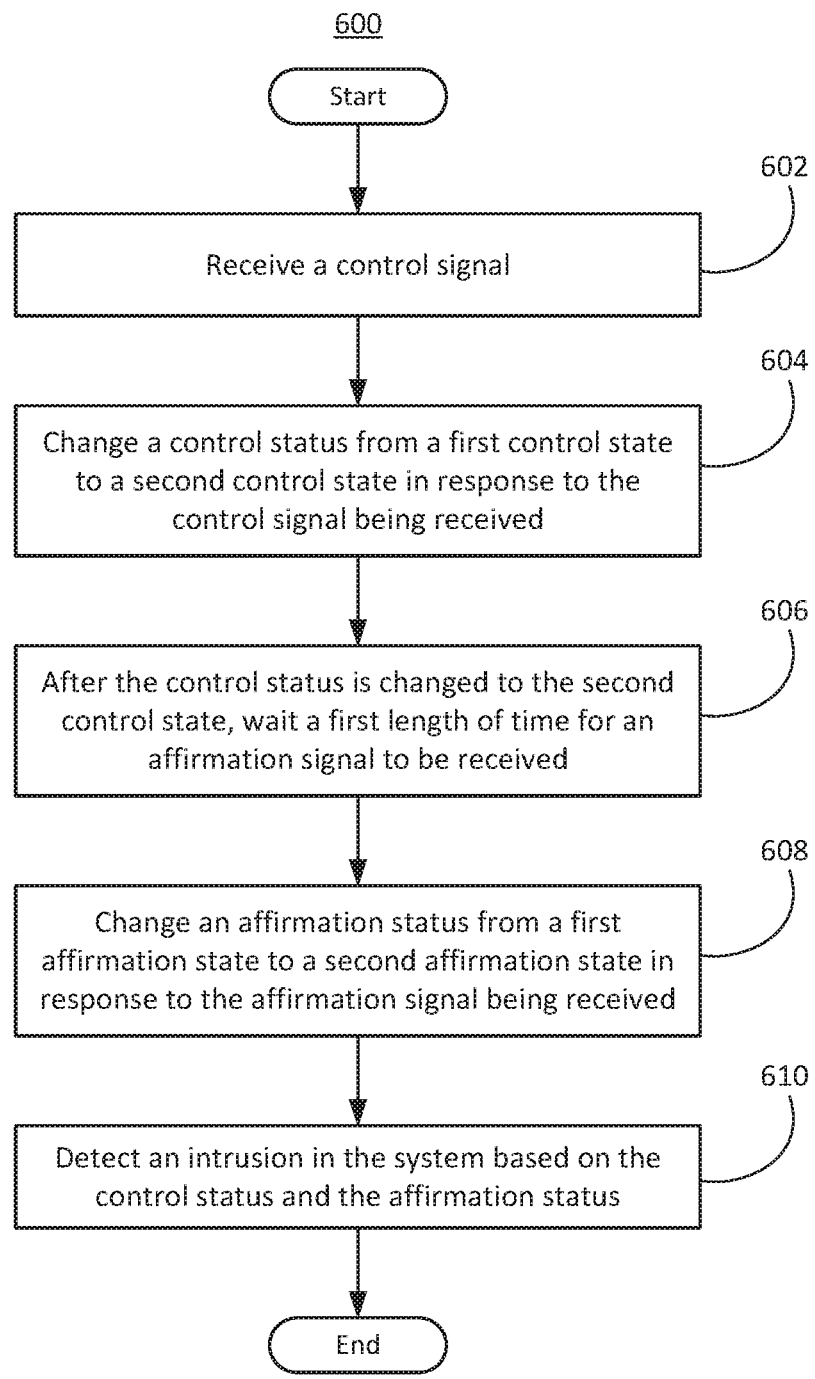

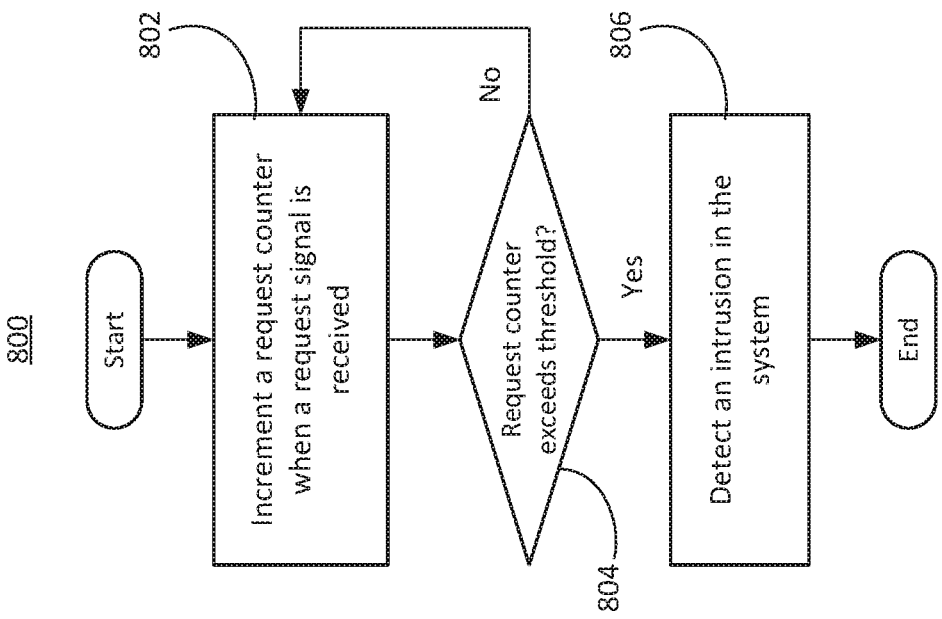
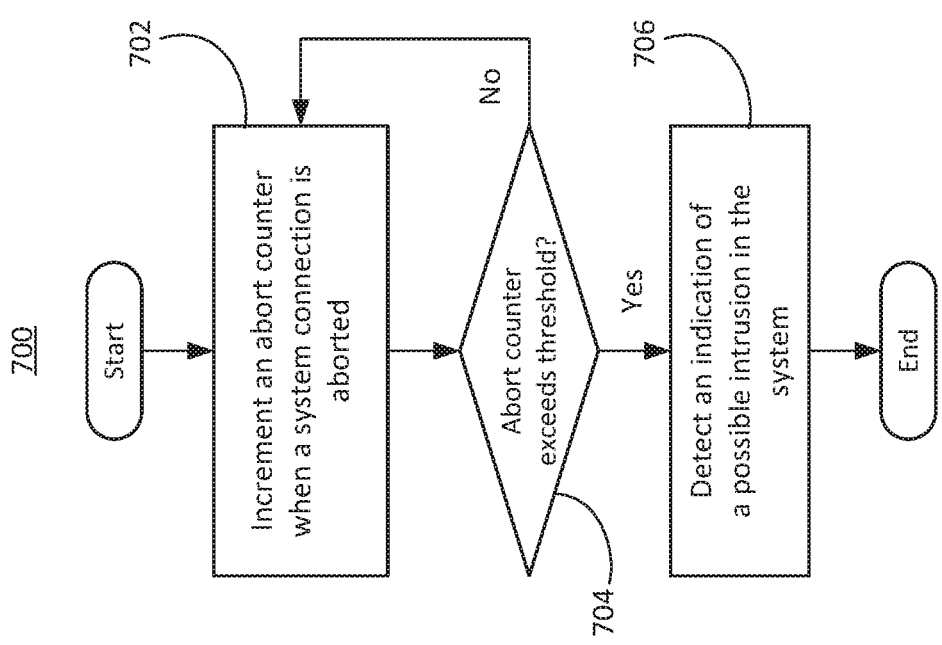

METHOD AND SYSTEM FOR DETECTING INTRUSION IN A VEHICLE SYSTEM

CROSS-REFERENCE TO RELATED APPLICATIONS

This application is a national phase application of International Application No. PCT/US2020/032710. filed on May 13, 2020, which claims priority to U.S. Provisional Application No. 62/846,999, filed on May 13, 2019, each incorporated herein by reference in its entirety.

FIELD OF THE DISCLOSURE

The present disclosure relates generally to computer security, especially to improving security of vehicle electronics.

BACKGROUND OF THE DISCLOSURE

Recently, more and more of the vehicles manufactured are "connected vehicles," or vehicles equipped with Internet access and usually also with a wireless local area network. Compared to their unconnected predecessors, these connected vehicles enjoy the advantage of access to vast amounts of information and services provided in the form of sharing data between a network and the vehicle. Different types of connections exist: vehicle-to-infrastructure (V2I), vehicle-to-vehicle (V2V), vehicle-to-cloud (V2C), vehicle-to-pedestrian (V2P), and vehicle-to-everything (V2X). However, the availability of wireless network access also comes with the danger of cyber intrusions, where hackers access the electronics within the vehicle through the wireless network and control the vehicle without the driver knowing.

Automotive cybersecurity is a major focus of attention for car manufacturers, and cybersecurity-embedded cars are already in production, with about 60% of connected cars expected to have built-in security solutions by the year 2025. Though connected cars are early adopters, autonomous vehicles and connected trucks are also expected to use built-in security solutions for cybersecurity in the future. Hence, it is necessary for manufacturers to adopt such security measures in connected trucks, as cyber-attacks in this segment tend to be massive and extremely harmful for organizations. Therefore, there is a need for an improved, real-time detection of cyber intrusions in the vehicle electronics.

SUMMARY OF THE DISCLOSURE

Various embodiments of the present disclosure relate to methods and systems to improve security of a computing system. In one embodiment, the method involves starting a timer of a predetermined length of time, and an expected number of cyclic messages to be received within the predetermined length of time is obtained. Then, a message counter is incremented each time a cyclic message is received within the predetermined length of time, and a set counter is incremented in response to an actual number of cyclic messages received by the end of the predetermined length of time exceeding the expected number of cyclic messages to be received by a first threshold value. An intrusion in the system is detected in response to the set counter exceeding a second threshold value by the end of the predetermined length of time.

In one aspect of the embodiment, a clear counter is incremented in response to the actual number of cyclic messages received by the end of the predetermined length of time failing to exceed the expected number of cyclic messages by the first threshold value. In another aspect of the embodiment, the set counter and the clear counter are reset in response to the clear counter exceeding a third threshold value by the end of the predetermined length of time. Furthermore, in another aspect of the embodiment, the set counter and the clear counter are reset in response to the set counter exceeding the second threshold value by the end of the predetermined length of time.

In one embodiment, the method involves starting a timer of a predetermined length of time, and a request counter is incremented each time a request signal is detected within the predetermined length of time. Also, a response counter is incremented each time a response signal is detected within the predetermined length of time. Furthermore, a set counter is incremented each time the response counter exceeds the request counter within the predetermined length of time. An intrusion is detected in the system in response to the set counter exceeding a first threshold value by the end of the predetermined length of time.

In one aspect of the embodiment, a clear counter is incremented each time the request counter exceeds or equals the response counter. In another aspect of the embodiment, the set counter and the clear counter are reset in response to the clear counter exceeding a second threshold value by the end of the predetermined length of time. In yet another aspect of the embodiment, the set counter and the clear counter are reset in response to the set counter exceeding the first threshold value by the end of the predetermined length of time.

In one embodiment, a control status is changed from a first control state to a second control state in response to a control signal being received. Then, after the control status is changed to the second control state, the method involves waiting a first length of time for an affirmation signal to be received. An affirmation status is changed from a first affirmation state to a second affirmation state in response to the affirmation signal being received. An intrusion is detected in the system based on the control status and the affirmation status.

In one aspect of the embodiment, the intrusion in the system is detected in response to the affirmation status being in the first affirmation state at end of the first length of time after the control status is changed to the second control state. In another aspect of the embodiment, the intrusion in the system is detected in response to at least one subsequent control signal being received when the control status is in the second control state and the affirmation status is in the second affirmation state. Furthermore, in another embodiment, an expected number of cyclic messages to be received within the predetermined length of time. A message counter is incremented each time a cyclic message is received within a predetermined length of time. A set counter is incremented in response to an actual number of cyclic messages received by the end of the predetermined length of time exceeding the expected number of cyclic messages to be received by a first threshold value. An intrusion is detected in the system in response to the set counter exceeding a second threshold value by the end of the predetermined length of time.

In one embodiment, an abort counter is incremented each time a system connection is aborted, and an indication of a possible intrusion in the system is detected in response to the abort counter exceeding a threshold value within a span of a predetermined length of time. In one aspect of this embodiment, the abort counter represents a sum of aborts of predefined types experienced by the computing system within the predetermined length of time.

In one embodiment, a request counter is incremented each time a request signal is received, and an intrusion is detected in the system in response to the request counter exceeding a threshold value within a span of a predetermined length of time. In one aspect of this embodiment, the request counter represents a sum of requests of predefined types received by the computing system within the predetermined length of time.

In one embodiment, a computing system includes a register configured to store a message counter and a set counter, and a processing unit associated with the register. The processing unit starts a timer of a predetermined length of time, obtains an expected number of cyclic messages to be received within the predetermined length of time, increments the message counter each time a cyclic message is received within the predetermined length of time, increments the set counter in response to an actual number of cyclic messages received by the end of the cycle exceeding the expected number of cyclic messages to be received by a first threshold value, and detects an intrusion in the system in response to the set counter exceeding a second threshold value by the end of the predetermined length of time.

In another embodiment, the computing system includes a register configured to store a request counter, a response counter, and a set counter, and a processing unit associated with the register. The processing unit starts a timer of a predetermined length of time, increments the request counter each time a request signal is detected within the predetermined length of time, increments the response counter each time a response signal is detected within the predetermined length of time, increments the set counter each time the response counter exceeds the request counter within the predetermined length of time, and detects an intrusion in the system in response to the set counter exceeding a first threshold value by the end of the predetermined length of time.

In yet another embodiment, the computing system includes a register configured to store a control status and an affirmation status of the system, and a processing unit associated with the register. The processing unit changes the control status from a first control state to a second control state in response to a control signal being received by a processing unit, waits a first length of time for an affirmation signal to be received by the processing unit after the control status is changed to the second control state, changes the affirmation status from a first affirmation state to a second affirmation state in response to the affirmation signal being received by the processing unit, and detects an intrusion in the system based on the control status and the affirmation status.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIG. 6 is a flow diagram of a method of improving security of a computing system in accordance with an embodiment as disclosed herein;

FIG. 7 is a flow diagram of a method of improving security of a computing system in accordance with an embodiment as disclosed herein;

FIG. 8 is a flow diagram of a method of improving security of a computing system in accordance with an embodiment as disclosed herein;

Figure 1:
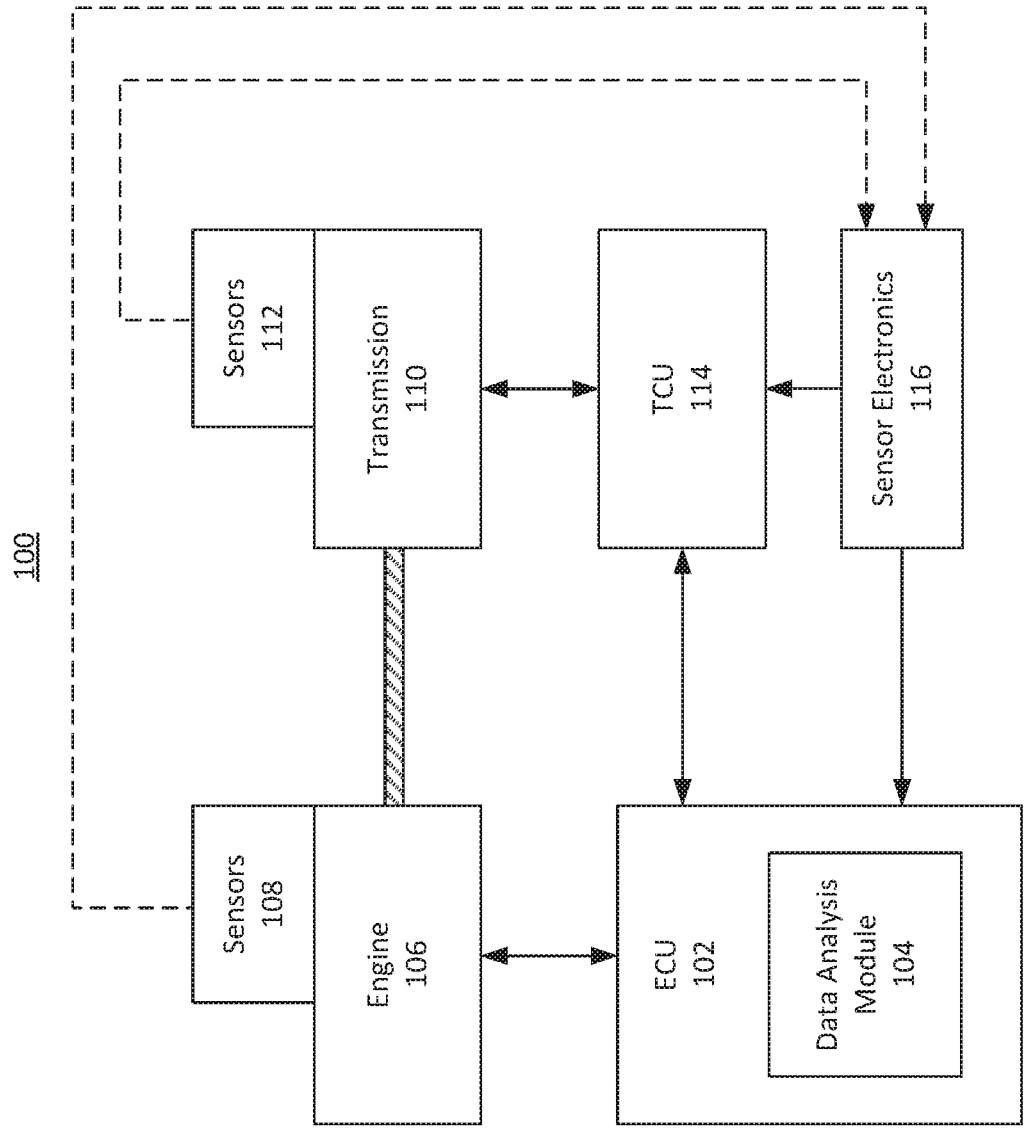
FIG. 1 is a schematic diagram of a vehicle's engine system which incorporates sensors and an electronic control unit to analyze the sensor data using a data analysis module.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

FIG. 1 shows an engine system 100 of a vehicle in which the engine system 100 is a network of embedded devices which includes an engine control unit (ECU) 102. The ECU 102 includes a data analysis module 104. The engine system 100 also includes an engine 106 with sensors 108, a transmission 110 with sensors 112, a transmission control unit 114, and sensor electronics 116. The ECU 102 is communicatively coupled via a data link with the TCU 114. Examples of the data link includes a Society of Automotive Engineers ("SAE") J1939 vehicle bus system or other suitable controller area network (CAN) bus system. It should be understood that the network of embedded devices depicted as engine system 100 may be deployed in any of a variety of different applications including a vehicle (e.g., a fully electric vehicle, a hybrid electric vehicle, or a vehicle with a conventional internal combustion engine (e.g., diesel, spark-ignited, dual fuel, etc.), a power generator, or other equipment.

The transmission 110 usually connects to a crankshaft of the engine 106 via a clutch. As should be understood from the foregoing, engine 106 is not intended to be limited to the various internal combustion engine types listed, but may also represent any device which transforms stored potential energy into mechanical energy, often but not exclusively for the purposes of propulsion (including, for example, an electric motor or motor/generator). The output of the transmission is transmitted via the driveshaft to one or more differentials (not shown), which drives the wheels. The ECU 102 provides control signals for operating the engine 106, and in response to the control signals the TCU 114 controls gear selection within the transmission 110. The sensors 108 and 112 send the measurement values regarding the engine and transmission states to the sensor electronics 116, as shown in the figure with broken lines, after which the data is received by the ECU 102. Examples of the sensors include barometric pressure sensors, knock sensors, exhaust gas sensors, engine coolant temperature sensors, etc. The sensor readings can indicate when the engine 106 or transmission 110 is not operating effectively or efficiently, in response to which the data analysis module 104 identifies that there is a problem and alerts the user of the vehicle. The data analysis module 104 also has an intrusion detection algorithm which is described in detail below, so that the module 104 can detect if there is a possibility that the ECU 102 received an instruction to provide certain control signals from an unauthorized source, e.g., via an intrusion from a hacker.

As indicated above, in some embodiments, the engine 106 works in concert with an electric motor which receives power in the form of electrical energy from an energy source such as a rechargeable battery, where the electric motor may also work as a power generator to recharge the battery by converting mechanical energy into electrical energy. In such embodiments, the engine system 100 is a hybrid engine system which uses not only the engine 106 but also the electric motor to drive the vehicle. Additionally, in some examples, the engine 106 may be replaced by the electric motor as the device transforming the stored potential energy, which in this case is the electrical energy stored in the battery, into rotational kinetic energy.

Figure 9:
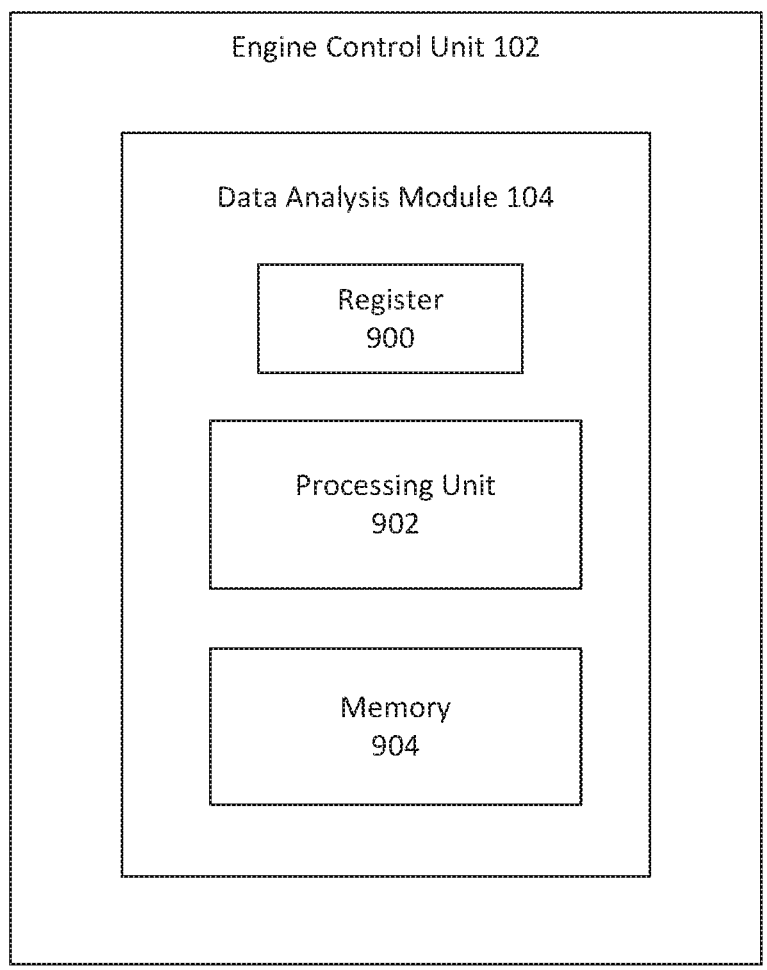
FIG. 9 is a schematic diagram of an engine control unit in accordance with an embodiment of the present disclosure.

FIG. 9 shows an example of the ECU 102 which includes a register 900, processing unit 902, and memory 904. The register 900 may be where the counter values as described herein are stored for access by the processing unit 902, which performs the intrusion detection algorithm as described herein. In one example, the memory 904 stores the instructions to perform said algorithm, as well as the threshold values necessary for the algorithm, as described herein. In another embodiment, the data analysis module 104 may be located outside of the ECU 102 and in a separate computing device that is connected to the ECU 102 and the TCU 114 via data links. In one example, the processing unit 902 can be any processing device appropriate for the system, including central processing units (CPU), system-on-chip (SoC) processors, and the like. The memory 904 may be static random access memory (SRAM), dynamic random access memory (DRAM), read-only memory (ROM), or flash memory, as appropriate.

Figure 2:
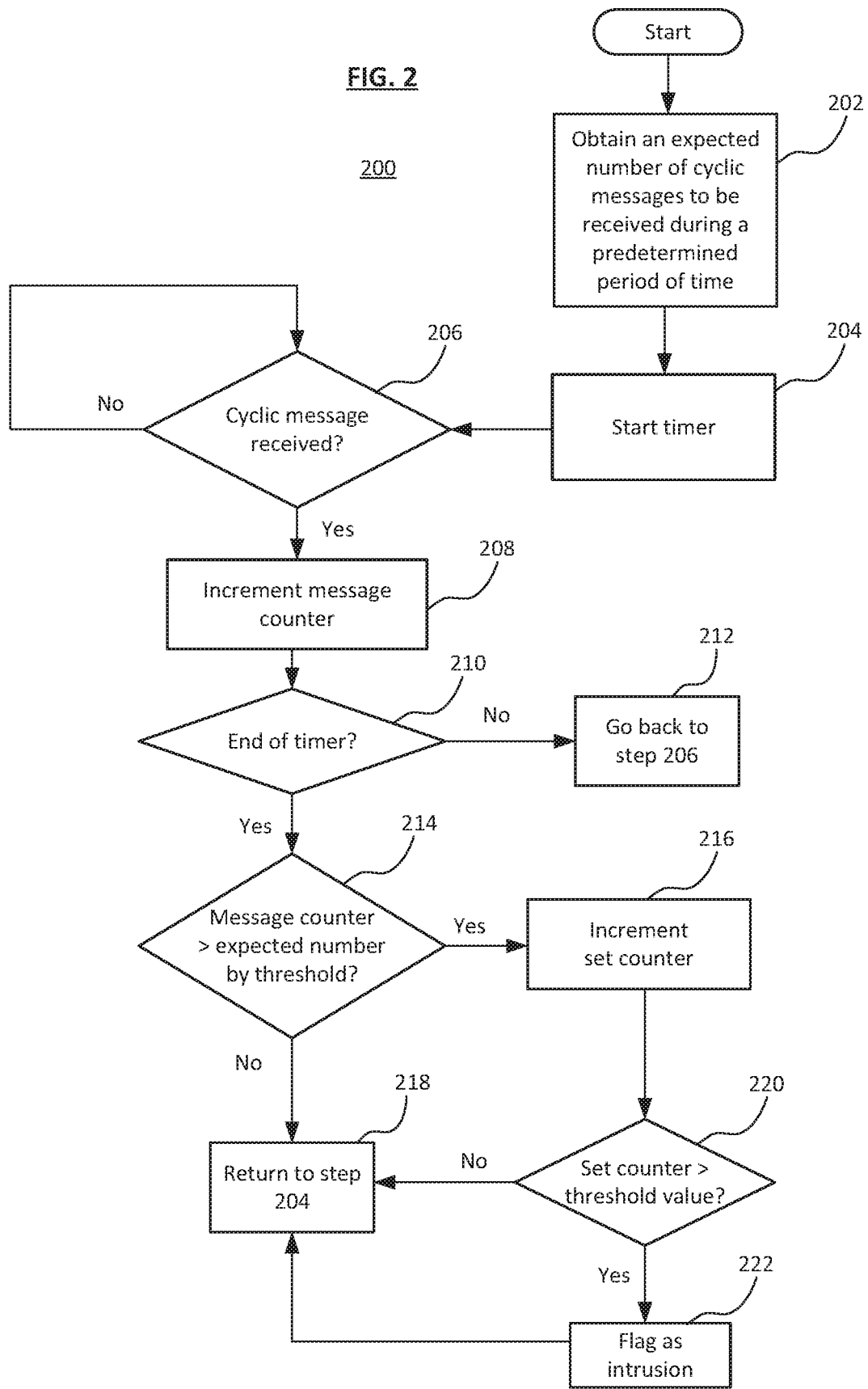
FIG. 2 is a flow diagram of a method of improving security of a computing system in accordance with an embodiment as disclosed herein.

FIG. 2 shows a method 200 according to the intrusion detection algorithm used to detect if there is intrusion in the ECU 102. In the first step 202, the processing unit obtains an expected number of cyclic messages (e.g., 8-byte frames and transport frames) to be received during a predetermined period of time. Then, in step 204, the processing unit of the ECU 102 starts a timer lasting the predetermined period of time. In some examples, the predetermined period of time is based on the cycle time such that the period of time for which the timer lasts is a multiple of the cycle time. In one example, the predetermined period of time is equal to ten times the length of the cycle time. In step 206, the processing unit determines if a cyclic message has been received within the predetermined period of time. If the message was received, then in step 208 a message counter is incremented. Otherwise, the processing unit returns to step 206 and waits for the message to be received. In step 210, the processing unit determines if the timer ended. If not, the process returns to step 206 to wait for additional cyclic messages.

When the end of the timer is reached, the processing unit proceeds to step 214 to determine if the value in the message counter is greater than the expected number of cyclic messages to be received within the predetermined period of time as obtained in step 202 by a certain threshold margin. If the number of cyclic messages that were actually received exceeds the expected number by more than the threshold margin, then the processing unit proceeds to step 216 to increment a set counter. Otherwise, the processing unit proceeds directly to step 218, which returns the process to step 204 to start the timer again, without incrementing the set counter. After incrementing the set counter in step 216, the processing unit proceeds to step 220 to determine if the value of the set counter is greater than a predetermined threshold value. If not, the processing unit proceeds to step 218 to return to step 204 and start the timer again. Otherwise, if yes, then the processing unit proceeds to step 222 to set a flag that there is an intrusion in the system, then proceeds to step 218.

Figure 3:
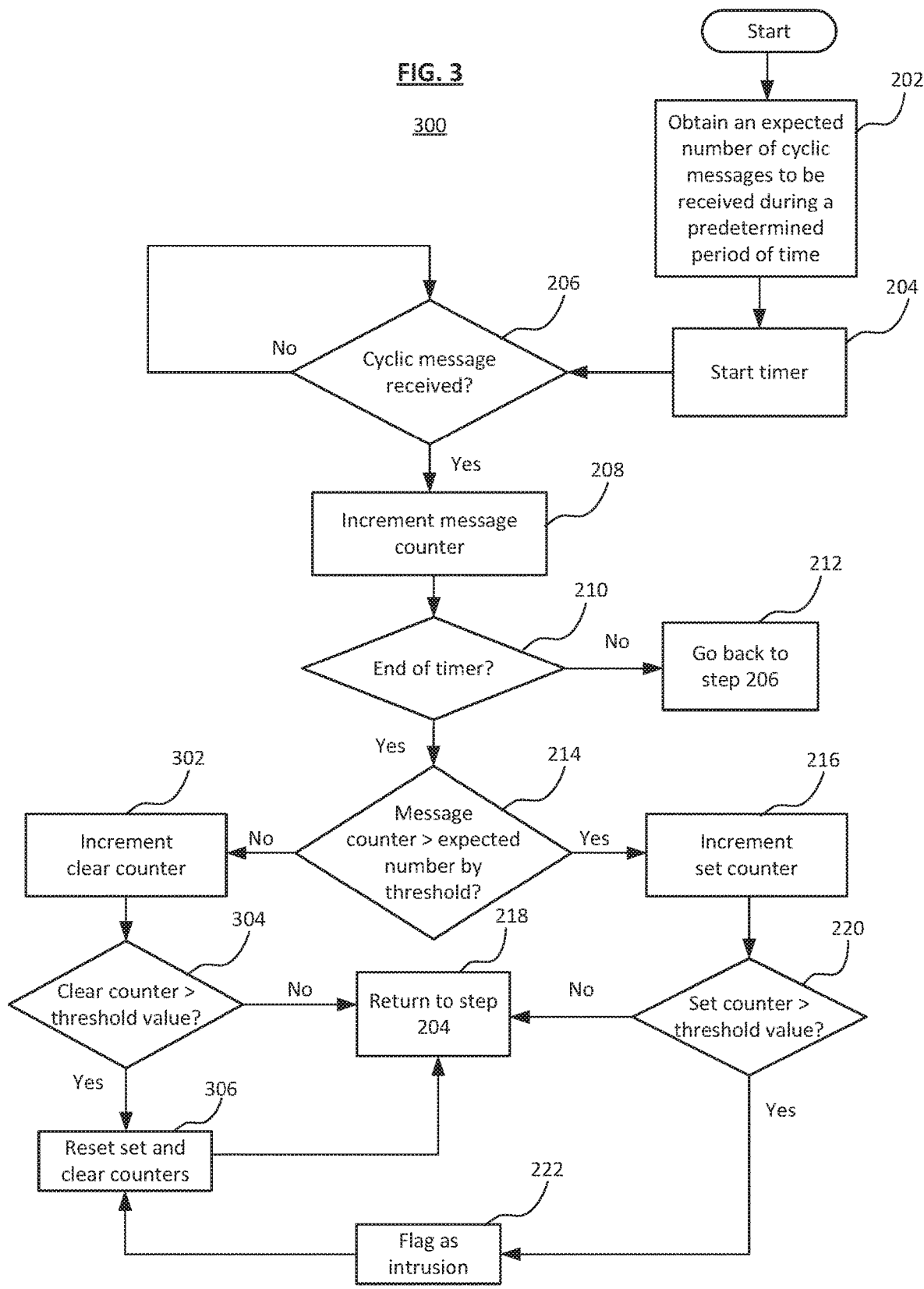
FIG. 3 is a flow diagram of a method of improving security of a computing system in accordance with an embodiment as disclosed herein.

FIG. 3 shows a method 300 which implements an additional counter, a clear counter. The method 300 is the same as the method 200 until step 214, after which if the value in the message counter fails to exceed the expected number of cyclic messages to be received by the threshold margin at the end of the timer, then the processing unit proceeds to step 302 to increment a clear counter. Then, the processing unit determines if the value of the clear counter is greater than a threshold value in step 304. If not, then the processing unit proceeds to step 218 to return to step 204 and start the timer; otherwise, if the value of the clear counter is greater than the threshold value, the processing unit resets the set and clear counters in step 306. In one example, these counters are reset in response to both the set counter and the clear counter exceeding their corresponding threshold values. Alternatively, if the message counter exceeds the expected number of cyclic messages to be received by the threshold margin in step 214, the set counter is incremented in step 216, and the processing unit then determines if the set counter exceeds the threshold value in step 220. If the set counter exceeds the threshold value, then step 222 is taken where the processing unit sets a flag that there is an intrusion in the system, followed by step 306 to reset the set and clear counters, then step 218 to return to step 204 and start the timer again. Otherwise, if the set counter does not exceed the threshold value in step 220, the process proceeds to step 218.

It should be noted that the values such as the amount of time for the timer in 204, the length of each cycle in step 202, the threshold margin in step 214, and the threshold value in step 220 are all predetermined according to the protocol to determine such values for each type of vehicle and engine. For example, the manufacturers may determine the appropriate values based on extensive testing and input these values as part of the algorithm, i.e., static values. Also, although the counters such as the message counter, set counter, and clear counter are described to be incrementing during each corresponding step, it should be understood that the same effect can be obtained by decrementing the counters instead of incrementing, i.e., the value of the counter may start out at a nonzero value which corresponds to the threshold value such that instead of determining if the counter exceeds a threshold value, the algorithm may only need to check if the counter reaches zero to enable the processing unit to proceed to the next appropriate step as explained above.

According to one example according to any one of the above-mentioned embodiments, the timer is set at 1 second and the registered cyclic time messages are counted for a time slot. A 10% tolerance margin is set as the threshold for deviation from the expected number of messages to be received in order to increment the set counter. The threshold value for the set counter to reach for the processing unit to detect an intrusion in the system is 5. Finally, the threshold value for the clear counter to reach to reset the set and clear counter is also 5. It should be noted that the time, threshold margin, and threshold values can be adjusted appropriately to suit the operation of the system.

Figure 4:
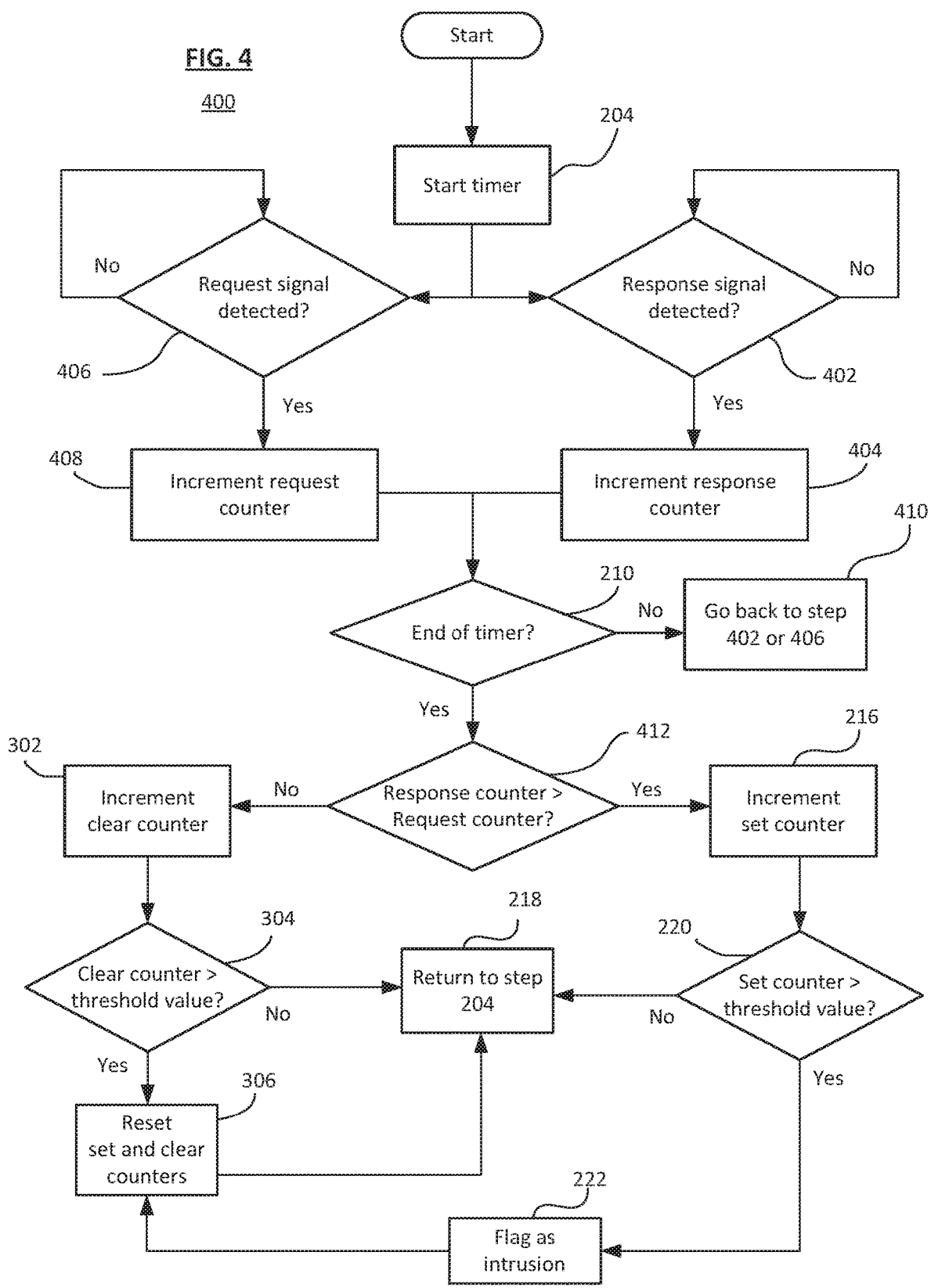
FIG. 4 is a flow diagram of a method of improving security of a computing system in accordance with an embodiment as disclosed herein.

FIG. 4 shows a method 400 according to another embodiment. The method 400 begins by staring a timer in step 204, and then simultaneously checking to see if a response signal (e.g., a response sent by the ECU to grant control of an operation of the engine or transmission) is detected during the cycle in step 402 and if a request signal (e.g., a request received by the ECU to control an operation of the engine or transmission) is detected during the cycle in step 406. If the response signal is detected, then the processing unit proceeds to step 404 to increment the response counter. If the request signal is detected, then the processing unit proceeds to step 408 to increment the request counter. In both steps 402 and 406, if neither a request signal nor a response signal is received, then the processing unit waits until either signal is received. Then, the processing unit determines if the end of the timer is reached in step 210. If not, the method goes back to step 402 or 406, as appropriate, as shown in step 410. It should be noted that, in any of methods 200, 300, and 400, the algorithm can be programmed to end at the end of a drive cycle. As such, in some examples, the methods 200, 300, and 400 can further include an additional decision step to determine if the end of the drive cycle has been reached after an intrusion is flagged or when the timer ends. If it is determined that the end of the drive cycle has not yet been reached, the method may return to step 204 to start the timer again.

When the end of the timer is reached, the processing unit proceeds to step 412 to determine if the response counter value exceeds the request counter value. Ideally, for each response signal, there is a corresponding counterpart, i.e., a request signal. If a response signal, which is the signal sent from the ECU 102 to activate the engine 106, but no request signal that corresponds to the response signal is detected, then there is a high probability that the response signal was unauthorized, caused by an intrusion hacking into the system to falsely activate the response signal without receiving the request signal from the system. The remaining processes after determining if there are more responses than requests are the same as those explained in method 300, i.e., if the response counter exceeds the request counter, the set counter is incremented according to step 216, and if the response counter does not exceed the request counter, the clear counter is incremented instead according to step 302. In one example, the clear counter is incremented when the request counter either equals or exceeds the response counter. In one example, the counter values are stored in a register to be readily accessible by the processing unit.

Figure 5:
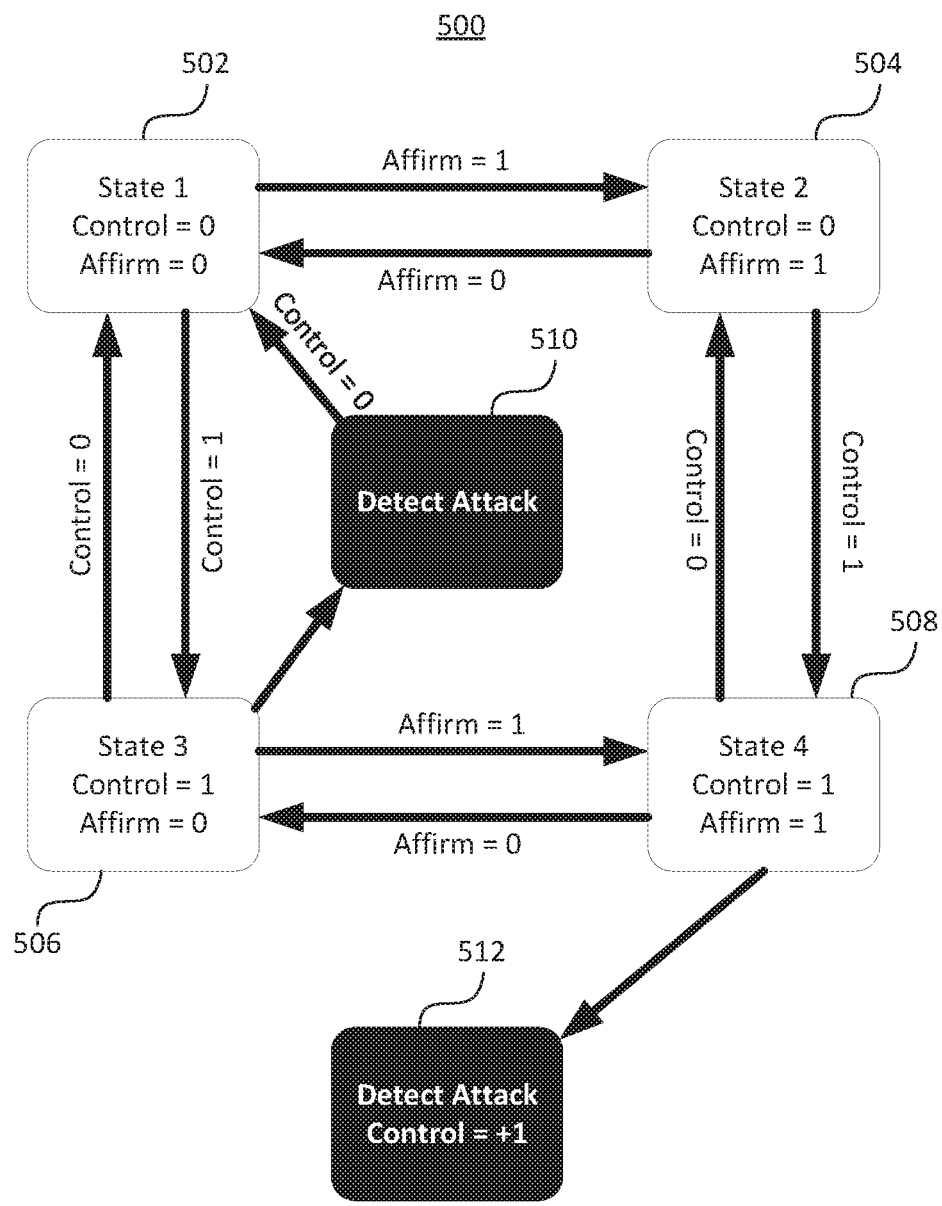
FIG. 5 is a flow diagram of a method of improving security of a computing system in accordance with an embodiment as disclosed herein.

FIG. 5 shows a method 500 according to one embodiment to differentiate between real and fake messages, e.g., torque speed control (TSC1) messages according to the SAE J1939 standard, that are received by the ECU 102. The method 500 involves using two bits of data (control bit and affirmation bit) to define a total of four states. The affirmation bit can be determined by multiple discrete signals. The first state 502 is when both bits are 0, the second state 504 is when only the affirmation bit is 1, the third state 506 is when only the control bit is 1, and the fourth state 508 is when both bits are 1. Activating the control bit to switch from 0 to 1 indicates when engine control is granted, whereas when the control bit remains 0, the engine control is denied. The affirmation bit becomes 1 when the system receives affirmation that the engine control should indeed be granted. As such, similar to the request-response relationship illustrated in the previous figure, there is ideally a one-to-one relationship between the control bit and affirmation bit, such that when either of the bits is activated, so should the other. In one example, there is a threshold value to the number of transmissions, e.g., parameter group number (PGN) transmissions, that can be made before which an affirmation is received.

If the engine control is granted but no affirmation is received within this threshold, the processing unit would know that there is a possible intrusion in the system. As represented by the second state 504, there may be cases when the affirmation bit is activated to be 1 while the control bit remains 0. In one example, the second state 504 does not trigger an attack alert because the engine control is not granted. On the other hand, when the control bit is 1 but the affirmation bit remains 0 according to the third state 506, and the affirmation is not received within a length of time determined by the threshold number of transmissions, the processing unit activates the attack detection alert 510. In response, the system may block the grant of engine control, such that the control bit is deactivated to be at the first state 502. In one example, the TSC1 messages are blocked by the system and cycle time detections are turned off to deactivate the control bit and return to the first state 502.

The other attack detection alert 512 occurs when there is already an affirmation received for a control grant. Thus, both the control bit and the affirmation bit are activated, but another control grant is subsequently detected in the system, which the processing unit responds to by flagging the subsequent control grant as an attack on the system. In one example, the subsequent control message is an aperiodic control message, to which the processing unit responds by locking the transmit rate and turning on cyclic injection detections to detect intrusions upon the first occurrence of a control grant. Furthermore, in one example, the cyclic intrusion detections are performed using the algorithm of the method 200 or 300. Specifically, in one example, the method 500 may further include the steps of obtaining from the cyclic messages, an expected number of cyclic messages to be received, incrementing a message counter each time a cyclic message is received within the first length of time (steps 206 and 208), incrementing a set counter in response to an actual number of cyclic messages received by the end of the timer exceeding the expected number of cyclic messages to be received by a threshold value (steps 210, 212, 214, and 216), and then detecting an intrusion in the system in response to the set counter exceeding a threshold when the timer runs out (steps 218, 220, and 222). Also, in one example, the control and affirmation bits are stored in a register that is readily accessible by the processing unit.

FIGS. 7 and 8 show two additional methods 700 and 800, respectively, of detecting intrusion or indication of a possible intrusion in the system using additional counters. The method 700 involves a first step 702 of incrementing an abort counter when a system connection is aborted. If the abort counter value does not exceed a threshold as determined in step 704, then the process returns to step 702, but otherwise proceeds to step 706 where an indication of a possible intrusion in the system is detected. In some embodiments, the system uses a list of possible reasons that the system connection is aborted, and the occurrence of each abort counts as one abort. For example, the abort can take place when the system is already in one or more connection-managed sessions and therefore cannot support another. For example, the abort can take place when system resources are needed for another task, so the connection-managed session was terminated. For example, the abort can also take place when there is an unexpected data transfer packet, or when the maximum retransmit request limit is reached. Other suitable examples for system connection abort can also be used. In one example, the processing unit also sets a timer of a predetermined length of time, and the processing unit compares the abort counter value to the threshold when the timer runs out. If no intrusion is suspected, then the timer is set again and the method 700 repeats itself. In one example, the timer is set to 1 second and the threshold is set to 10 aborts per second. In one example, the abort counter represents a sum of aborts of predefined types experienced by the system within a predetermined period of time.

The method 800 detects a denial-of-service (DoS) attack on the system which is achieved by flooding the CAN with request control message signals. The method 800 involves the first step 802 of incrementing a request counter when a request signal is received by the system, particularly the ECU 102 for example. Then, in step 804, the processing unit determines if the request counter value exceeds a threshold. If not, the process returns to step 802. However, if the request counter value exceeds the threshold, then an intrusion in the system is detected in step 806. The threshold can be determined experimentally or arbitrarily. In one example, a timer is set at 1 second and the processing unit compares the request counter value with the threshold at the time when the timer runs out. In one example, the threshold may be set at 50 messages within the time span of 1 second. In one example, the request counter represents a sum of requests of predefined types (there may be a plurality of types of requests that are sent to the ECU 102 as is known in the art) received by the system during a predetermined period of time.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of improving security of a computing system having a network of embedded devices, the method comprising:
   (a) obtaining an expected number of cyclic messages to be received within a predetermined length of time;
   (b) starting a timer of the predetermined length of time;
   (c) when the timer is running, incrementing a message counter each time a cyclic message is received within the predetermined length of time, such that each increment of the message counter represents one cyclic message that is received before the timer ends at the end of the predetermined length of time;
   (d) when the timer ends, incrementing a set counter in response to the message counter exceeding the expected number of cyclic messages to be received by a first threshold value;
   (e) repeating steps (b), (c), and (d) during which the set counter is continuously incremented until the set counter exceeds a second threshold value; and
   (f) detecting an intrusion in the system in response to the set counter exceeding the second threshold value.

2. The method of claim 1, further comprising, in step (d):
   when the timer ends, incrementing a clear counter in response to the message counter failing to exceed the expected number of cyclic messages by the first threshold value.

3. The method of claim 2, further comprising, in step (d):
   when the timer ends, resetting the set counter and the clear counter in response to the clear counter exceeding a third threshold value.

4. The method of claim 3, further comprising, in step (d):
   when the timer ends, resetting the set counter and the clear counter in response to the set counter exceeding the second threshold value.

5. The method of claim 1, further comprising:
   changing a control status from a first control state to a second control state in response to a control signal being received;
   after the control status is changed to the second control state, waiting a first length of time for an affirmation signal to be received;

changing an affirmation status from a first affirmation state to a second affirmation state in response to the affirmation signal being received; and detecting the intrusion in the system based on the control status and the affirmation status.

6. The method of claim 5, wherein the intrusion in the system is detected in response to the affirmation status being in the first affirmation state at end of the first length of time after the control status is changed to the second control state.

7. The method of claim 5, wherein the intrusion in the system is detected in response to at least one subsequent control signal being received when the control status is in the second control state and the affirmation status is in the second affirmation state.

8. A method of improving security of a computing system having a network of embedded devices, the method comprising:
(a) starting a timer defining a predetermined length of time;
(b) when the timer is running, within the predetermined length of time,
incrementing a request counter each time a request signal is detected such that each increment of the request counter represents one request signal; and
incrementing a response counter each time a response signal is detected such that each increment of the response counter represents one response signal;
(c) when the timer ends, incrementing a set counter each time the response counter exceeds the request counter;
(d) repeating steps (a), (b), and (c) during which the set counter is continuously incremented until the set counter exceeds a first threshold value; and
(e) detecting an intrusion in the system in response to the set counter exceeding the first threshold value.

9. The method of claim 8, further comprising, in step (c):
when the timer ends, incrementing a clear counter each time the request counter exceeds or equals the response counter.

10. The method of claim 9, further comprising, in step (c):
when the timer ends, resetting the set counter and the clear counter in response to the clear counter exceeding a second threshold value.

11. The method of claim 10, further comprising, in step (c):
when the timer ends, resetting the set counter and the clear counter in response to the set counter exceeding the first threshold value.

12. The method of claim 8, further comprising:
obtaining an expected number of cyclic messages to be received during the predetermined length of time;
when the timer is running, incrementing a message counter each time a cyclic message is received;
when the timer ends, incrementing a set counter in response to the message counter exceeding the expected number of cyclic message to be received by a second threshold value; and
detecting the intrusion in the system in response to the set counter exceeding a third threshold value.

13. A method of improving security of a computing system having a network of embedded devices, the method comprising:
incrementing an abort counter each time a system connection is aborted such that each increment of the abort counter represents one instance of the system connection being aborted; and detecting an indication of a possible intrusion in the system in response to the abort counter exceeding a threshold value within a span of a predetermined length of time.

14. The method of claim 13, wherein the abort counter represents a sum of aborts of predefined types experienced by the computing system within the predetermined length of time.

15. A method of improving security of a computing system having a network of embedded devices, the method comprising:
incrementing a request counter each time a request signal is received such that each increment of the request counter represents one request signal; and
detecting an intrusion in the system in response to the request counter exceeding a threshold value within a span of a predetermined length of time.

16. The method of claim 15, wherein the request counter represents a sum of requests of predefined types received by the computing system within the predetermined length of time.

17. A computing system having a network of embedded devices, at least one of the embedded devices comprising:
a register configured to store a message counter and a set counter; and
a processing unit associated with the register, the processing unit configured to:
(a) obtain an expected number of cyclic messages to be received within a predetermined length of time;
(b) start a timer of the predetermined length of time;
(c) when the timer is running, increment the message counter each time a cyclic message is received within the predetermined length of time, such that each increment of the message counter represents one cyclic message that is received before the timer ends at the end of the predetermined length of time;
(d) when the timer ends, increment the set counter in response to the message counter exceeding the expected number of cyclic messages to be received by a first threshold value;
(e) repeat steps (b), (c), and (d) during which the set counter is continuously incremented until the set counter exceeds a second threshold value; and
(f) detect an intrusion in the system in response to the set counter exceeding a second threshold value.

18. The computing system of claim 17, wherein
the register is further configured to store a control status and an affirmation status of the system; and
the processing unit associated with the register, is further configured to:
change the control status from a first control state to a second control state in response to a control signal being received by a processing unit;
after the control status is changed to the second control state, wait a first length of time for an affirmation signal to be received by the processing unit;
change the affirmation status from a first affirmation state to a second affirmation state in response to the affirmation signal being received by the processing unit; and
detect the intrusion in the system based on the control status and the affirmation status.

19. A computing system having a network of embedded devices, at least one of the embedded devices comprising:
a register configured to store a request counter, a response counter, and a set counter; and a processing unit associated with the register, the processing unit configured to:
 (a) start a timer of a predetermined length of time;
 (b) when the timer is running, within the predetermined length of time, increment the request counter each time a request signal is detected such that each increment of the request counter represents one request signal; and
  increment the response counter each time a response signal is detected such that each increment of the response counter represents one response signal;
 (c) when the timer ends, increment the set counter each time the response counter exceeds the request counter;
 (d) repeat steps (a), (b), and (c) during which the set counter is continuously incremented until the set counter exceeds a first threshold value; and
 (e) detect an intrusion in the system in response to the set counter exceeding the first threshold value.

* * * * *